United States Patent
Matsumoto et al.

(10) Patent No.: US 6,249,610 B1
(45) Date of Patent: Jun. 19, 2001

(54) APPARATUS AND METHOD FOR CODING A PICTURE AND APPARATUS AND METHOD FOR DECODING A PICTURE

(75) Inventors: Taisuke Matsumoto; Akiyoshi Tanaka, both of Kawasaki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/011,204

(22) PCT Filed: Jun. 17, 1997

(86) PCT No.: PCT/JP97/02078

§ 371 Date: Feb. 18, 1998

§ 102(e) Date: Feb. 18, 1998

(87) PCT Pub. No.: WO97/49250

PCT Pub. Date: Dec. 24, 1997

(30) Foreign Application Priority Data

Jun. 19, 1996 (JP) .................................................... 8-157851
Mar. 13, 1997 (JP) .................................................... 9-58917

(51) Int. Cl.[7] .............................. G06K 9/64; G06K 9/40
(52) U.S. Cl. .......................................... 382/232; 382/260
(58) Field of Search ................................... 382/232–235, 382/236, 238–242, 248, 251, 260, 261–264, 265, 266, 275, 199; 704/200, 229, 230; 358/261.1, 426, 432, 433, 479

(56) References Cited

U.S. PATENT DOCUMENTS

| 5,122,875 | * | 6/1992 | Raychaudhuri et al. | 358/133 |
| 5,198,940 | * | 3/1993 | Nagasawa et al. | 382/232 |
| 5,241,387 | * | 8/1993 | Fujikawa et al. | 358/167 |
| 5,384,869 | * | 1/1995 | Wilkinson et al. | 382/232 |
| 5,694,492 | * | 12/1997 | Kim | 382/262 |

FOREIGN PATENT DOCUMENTS

| 3-32183 | 2/1991 | (JP) | H04N/7/133 |
| 4-10884 | 1/1992 | (JP) | H04N/7/13 |
| 4192695 | 7/1992 | (JP) | H04N/7/137 |
| 8-18957 | 1/1996 | (JP) | H04N/7/24 |
| 8-79754 | 3/1996 | (JP) | H04N/7/30 |

OTHER PUBLICATIONS

An English Language abstract of JP 8–79754.
An English Language abstract of JP 8–18957.
An English Language abstract of JP4–10884.
An English Language abstract of JP 3–32183.
An English Language abstract of JP 4–192695.
An article by T. Fukinuke entitled; "Multi–Dimensional Signal Processing for TV Pictures", Published Nov. 15, 1988.

(List continued on next page.)

Primary Examiner—Jose L. Couso
Assistant Examiner—Duy M. Dang
(74) Attorney, Agent, or Firm—Greenblum & Bernstein, P.L.C.

(57) ABSTRACT

In a picture coding apparatus, a picture reproducing section is prepared at the latter part of the picture coding apparatus, detection of noise existing in a reproduced picture and selection of an appropriate filter to correct the reproduced picture according to characteristics of noise are carried out by comparing the input picture and the reproduced picture and information concerning a picture and information concerning a filter are multiplexed to transmit. And in a picture decoding apparatus, the information concerning the picture and the information concerning the filter are extracted from input signals, a picture is reproduced from the information concerning the picture and the filter to correction process to the reproduced picture is switched according to the information concerning filter.

20 Claims, 9 Drawing Sheets

OTHER PUBLICATIONS

An article by Yasuo Katayama (Graphics Communication Technologies, Ltd.) entitled, "Restration of Coded Images by Post Filtering," published 1990 by Systems Division of Electronic Society.

An article by Masahide Kaneko et al.,(KDD Research and Development Laboratories) entitled, "Noise Reduction Method For Transforming Coding of Frame–To–Frame Difference Signals", published 1985 by Systems Division of Electronic Communication Society

* cited by examiner

| NOISE GENERATING DIRECTION | TYPE OF FILTER | STRENGTH | | |
|---|---|---|---|---|
| | | 1 | 2 | 3 |
| NO NOISE | PASS | — | — | — |
| HORIZONTAL DIRECTION | HORIZONTAL FILTER | FILTER IN FIG.4A | FILTER IN FIG.4B | FILTER IN FIG.4C |
| VERTICAL DIRECTION | VERTICAL FILTER | FILTER IN FIG.4D | FILTER IN FIG.4E | FILTER IN FIG.4F |
| HORIZONTAL VERTICAL DIRECTION | TWO-DIMENSIONAL FILTER | FILTER IN FIG.4G | FILTER IN FIG.4H | FILTER IN FIG.4I |

APPARATUS AND METHOD FOR CODING A PICTURE AND APPARATUS AND METHOD FOR DECODING A PICTURE

TECHNICAL FIELD

The present invention relates to a picture coding apparatus and a method for coding digital picture signals and a picture decoding apparatus and a method for decoding coded digital picture signals.

BACKGROUND ART

Recently, as digital signal processing technology makes progress, coding apparatus for still pictures in digital still cameras, photo videotex and so on and coding apparatus for moving pictures utilized in video telephones, videoconferencing system, video CD system, DVD system, digital VTR(image processing system) and so on have been developed. For instance, coding apparatus utilizing orthogonal transform described in "Multi-dimensional Signal Processing for TV Pictures" written by Takahiko FUKINUKE (From page 213 to page 291, Chapter VII:High-efficient Coding, published Nov. 15, 1988 by Nikkan Kogyo Papers) and coding apparatus utilizing motion compensated interframe prediction are known.

In these apparatus, a digital picture discreted in M pixel in horizontal direction and N line in vertical direction are divided in blocks having m pixels in horizontal direction and n lines in vertical direction, and, in each block, high-efficient coding by motion compensated prediction processing, orthogonal transform processing and quantization processing orthogonal transform coefficient is carried out.

A conventional picture coding apparatus and a conventional picture decoding apparatus utilizing discrete cosine transform(abbreviated as DCT in the following) are explained below by using FIG. 9.

Figure 9A:
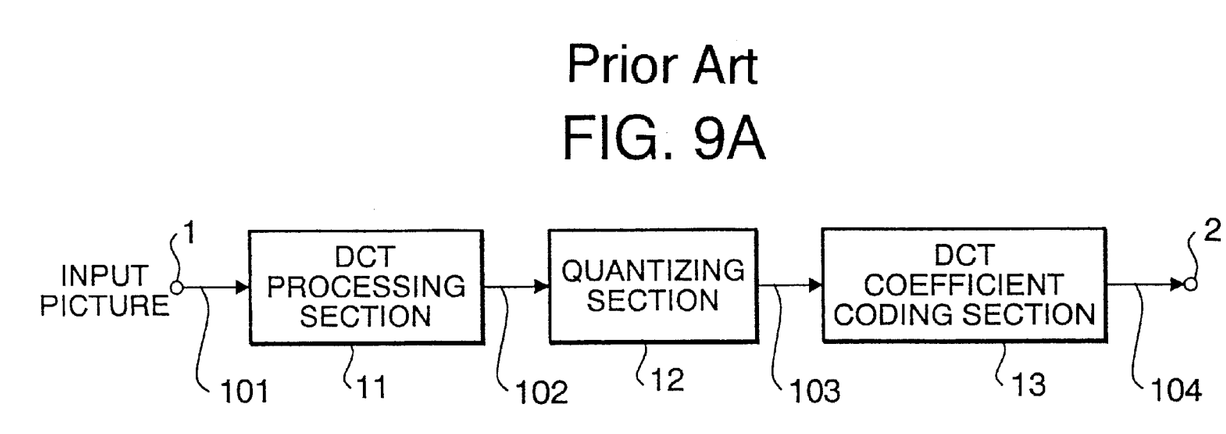
FIG. 9A is a block diagram of a conventional picture coding apparatus.

In FIG. 9A, 1 is an input terminal to which digital picture signals is input, 2 is an output terminal for outputting coded input picture signals, 11 is DCT processing section for processing two-dimensional DCT to each block of digital picture divided in blocks, 12 is quantizing section for quantizing DCT coefficients obtained by DCT processing section 11 and 13 is DCT coefficient coding section for transgenerating quantized DCT coefficients into code word.

Figure 9B:
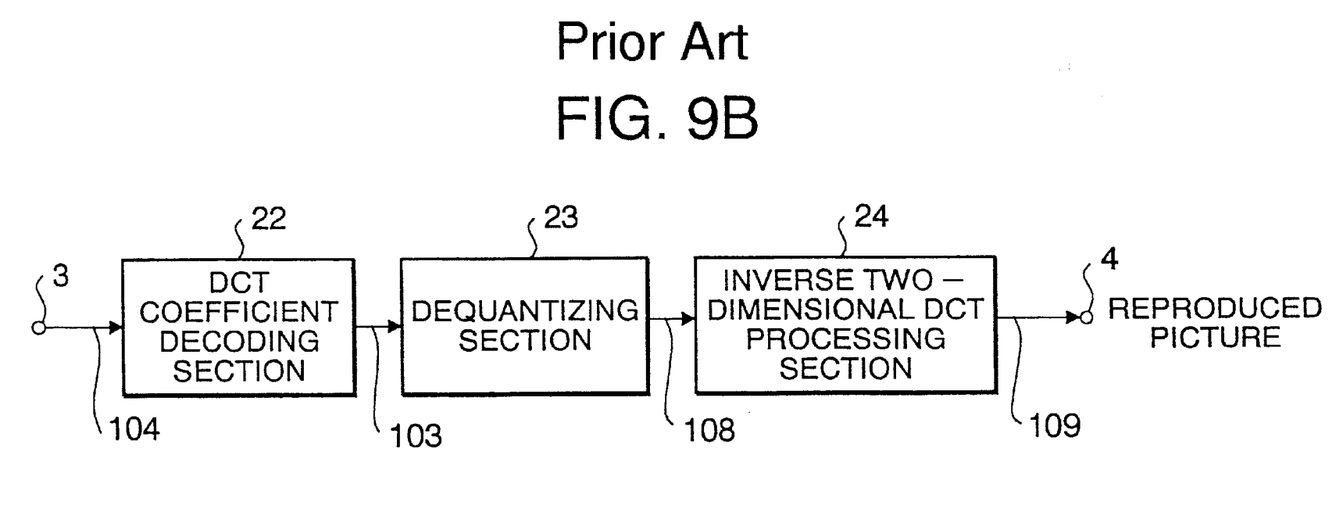
FIG. 9B is a block diagram of a conventional picture decoding apparatus.

And, in FIG. 9B, 3 is an input terminal to which code word is input, 4 is an output terminal for outputting decoded digital pictures, 22 is DCT coefficient decoding section for reproducing quantized DCT coefficients from code word, 23 dequantizing section to obtain non-quantized DCT coefficients from quantized DCT coefficients and 24 is inverse two-dimensional DCT processing section for reproducing a picture from DCT coefficients obtained by dequantizing section 23.

Each operation of the picture coding apparatus and the picture decoding apparatus constituted as described above is explained.

In the picture coding apparatus, an input picture is transformed into digital signals by an analog-digital converting circuit which is not shown and the input picture transformed into digital signals is divided in blocks in m pixels in horizontal direction and n lines in vertical directions. Each block of the input picture divided in block unit is input from input terminal 1 as digital picture signal 101. DCT processing section 11 acquires digital signal 101 comprised of one block as one unit and processes two-dimensional DCT to output DCT coefficient 102. Quantizing section 12 quantizes DCT coefficient 102 received from DCT processing section 11 and outputs DCT coefficient 103. Coding section 13 outputs code word 104 corresponding to quantized DCT coefficient 103 received from quantizing section 12.

In the picture decoding apparatus, code word 104 provided from input terminal 3 is transformed into quantized DCT coefficient 103 by DCT coefficient decoding section 22. Dequantizing section 23 transforms quantized DCT coefficient 103 input from DCT coefficient decoding section 22 into DCT coefficient 108.

Inverse two-dimensional DCT processing section 24 processes inverse two-dimensional DCT to DCT coefficient 108 to obtain reproduced picture 109.

By the way, block dividing digital pictures then coding a digital picture by quantizing orthogonal transform and orthogonal transform coefficient in block unit as described above results in the difference between the signal value before coding processing and the decoded signal value in a block, which is caused by error in DCT/inverse DCT and quantizing error. That brings signal non-continuity in neighbor blocks, then noise called block distortion generates.

As measures to prevent this noise, a method for giving mask processing to orthogonal transform coefficient in picture coding apparatus (for instance, Separate volume 1-202 of Collections of National Conference Lecture Theses in Information/System Division of Electronic Communication Society in 1985) and a method for restoring a decode picture by using a post filter in a picture decoding apparatus (for instance, Separate volume 7 D-307 of Collections of Spring National Conference Lecture Theses in Electronic Information Communication Society in 1990) are proposed.

However, these methods can not decide which makes the non-continuity in block boundary, error caused by coding-decoding processing or edge component which the original input picture have, then it is impossible to completely prevent noise generation and to collect the reproduced picture.

DISCLOSURE OF INVENTION

The present invention is based on the facts described above.

The first purpose of the present invention is to provide an apparatus and a method for coding a picture which generate filter information used to appropriately correct non-continuity on a block boundary caused by error in coding/decoding processing.

And the second purpose of the present invention is to provide an apparatus and a method for decoding a picture which acquire the filter information used to appropriately correct non-continuity on a block boundary from input data, correct a reproduced picture and obtain high quality reproduced picture.

In the present invention, in the picture coding apparatus, a coded picture is reproduced once, noise component in the reproduced pictures is detected by comparing the reproduced picture and the input picture, a correction filter for the reproduced picture is selected corresponding to the characteristics of the noise then information on the selected correction filter for the reproduced picture is provided into the picture decoding apparatus for reproducing a coded picture.

Namely, in the coding apparatus, a direction and scale of non-continuity of signal value on a block boundary in the reproduced picture and whether the edge of the input picture causes the generation of the non-continuity or not are judged, and, based on the judged results, characteristics of filter and timing of turning on or off the filter are selected. Then, in the decoding apparatus, appropriate filter processing is carried out to the only part which requires correction by filter. These steps bring improvement of picture quality in a whole picture.

In the present invention, in the picture coding apparatus, by preparing a picture reproducing section at the latter part in the picture coding section and comparing the input picture and the reproduced picture, noise existing in the reproduced picture is detected, an appropriate filter according to the characteristics of the detected noise is selected then multiplexed information concerning the picture and filter is transmitted to establish the purpose described above.

And in the picture decoding apparatus, the information concerning the picture and the information concerning the filter are extracted from the transmitted information by inverse multiplex processing it, the picture is reproduced from the information concerning the picture then correction processing to the reproduced picture is carried out based on the information concerning the filter to establish the purpose described above.

A noise generation and characteristics of the noise in the reproduced picture obtained by coding processing then decoding processing are expected to be measured by calculating finite difference value between signal values of input picture and output picture. For instance, in the case where the finite difference value is not zero at a coordinate, it is known that noise generates on the pixel at the coordinate and the noise strength is calculated by the scale of finite difference value. Furthermore, by measuring the finite difference value of pixels locating on the periphery of the pixel where the noise is generating, it is possible to measure the distribution whether the generating noise is isolated or the noise generates in wide area including peripheries.

Accordingly, the present invention makes it possible by the means constituted as described above to correct the reproduced picture without influencing on pixels where noise does not generate by detecting the pixel where noise generates, selecting the filter corresponding to the strength of noise, and, in the case where noise generates on the peripheral pixels, by selecting the direction and range for which the filter is applied according to the noise distribution.

BRIEF DESCRIPTION OF DRAWINGS

FIG. 4A to FIG. 4I illustrate diagrams of various filters in a filter processing section according to the embodiment of the present invention.

BEST MODE FOR CARRYING OUT THE INVENTION

The embodiment of the present invention is explained by referencing figures in the following.

Figure 1A:
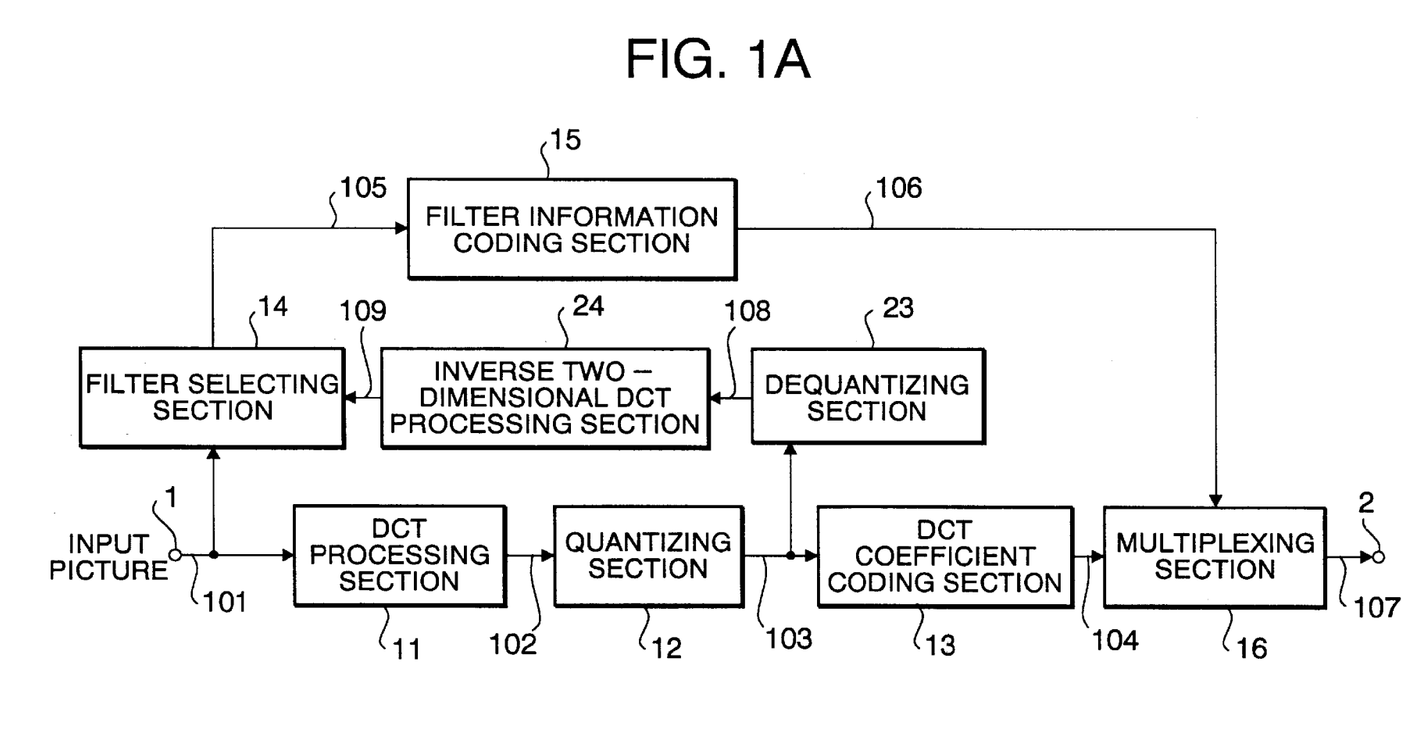
FIG. 1A is a block diagram of a picture coding apparatus according to the embodiment of the present invention.

FIG. 1A is a block diagram of a picture coding apparatus according to the embodiment of the present invention.

This picture coding apparatus comprises input terminal 1 to which digital picture signals are input, output terminal 2 for outputting coded signals, DCT processing section 11 for processing two-dimensional DCT to each block of digital picture divided in blocks, quantizing section 12 for quantizing DCT coefficient obtained by DCT processing section 11 and DCT coefficient coding sections 13 for transforming quantized DCT coefficient into a code word. It also comprises filter selecting section 14 for detecting noise and determining an appropriate filter to correct the detected noise by comparing the picture reproduced in the apparatus and the input picture, filter information coding section for transforming the information concerning the determined filter into a code word and multiplex section 16 for multiplexing the coded signals for the DCT coefficients and the code word for the filter information. It furthermore comprises, to reproduce the picture coded in the apparatus, dequantizing section 23 for obtaining the DCT coefficients by dequantizing the DCT coefficients quantized in quantizing section 12 and inverse two-dimension DCT processing section 24 for reproducing a picture from DCT coefficients obtained in dequantizing section 23.

Figure 1B:
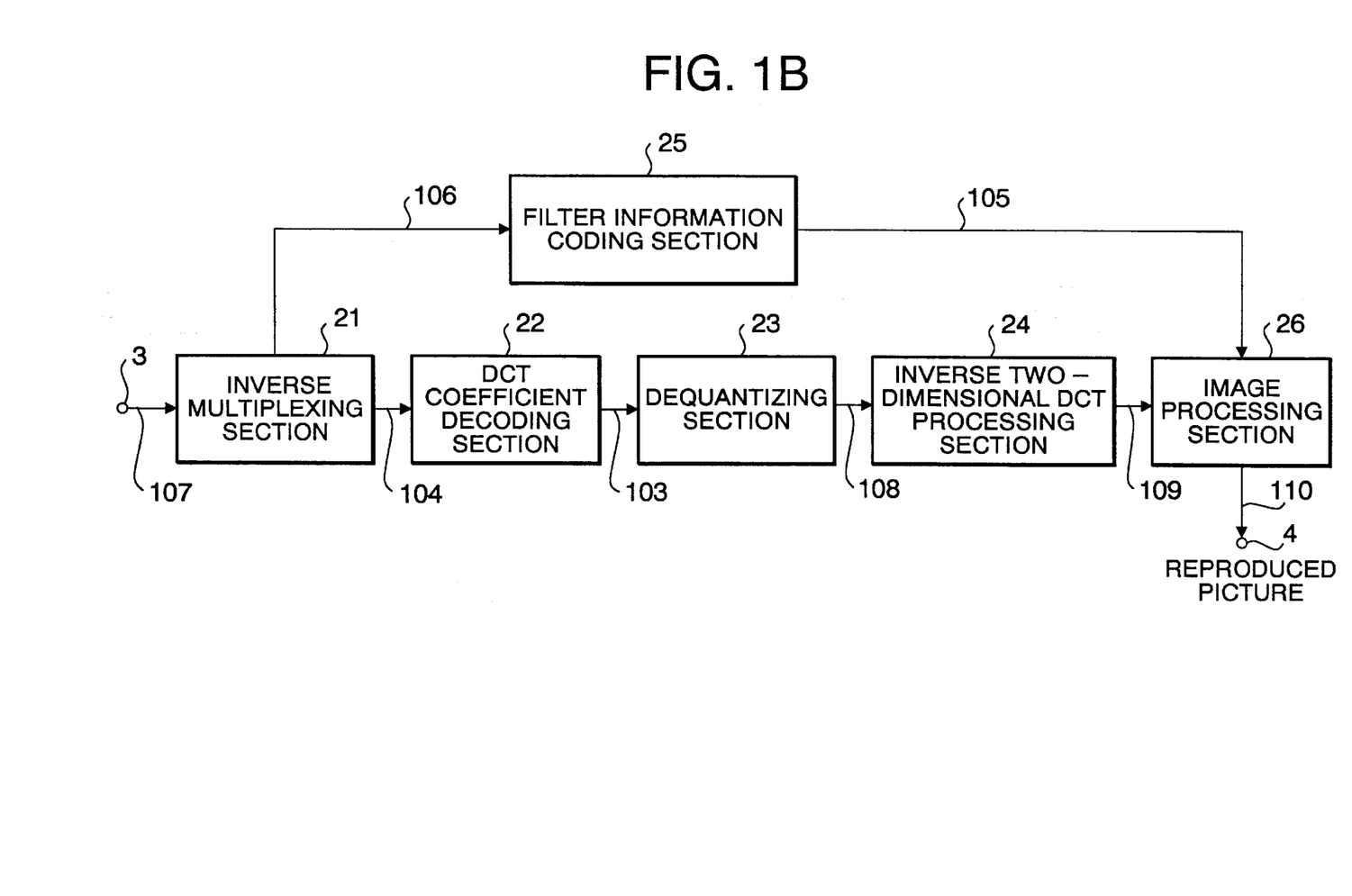
FIG. 1B is a block diagram of a picture decoding apparatus according to the embodiment of the present invention.

FIG. 1B is a block diagram of a picture decoding apparatus according to the embodiment of the present invention.

This decoding apparatus comprises input terminal 3 to which code word is input, output terminal 4 for outputting decoded digital picture, inverse multiplexing section 21 for dividing the code word for DCT coefficients and the code word for the filter information from the input signals, DCT coefficient decoding section 22 for transforming the coded signals for DCT coefficients into quantized DCT coefficients, dequantizing section 23 for dequantizing the quantized DCT coefficients to obtain DCT coefficient, inverse two-dimensional DCT processing section 24 for reproducing a picture from the DCT coefficients obtained in dequantizing section 23, filter information decoding section 25 to obtain filter information which is necessary to correct the reproduced picture from the filter information divided from the code word and picture processing section 26 for correct processing the reproduced picture based on the filter information.

The operations of the picture coding apparatus and the picture decoding apparatus constituted above are explained.

Figure 7:
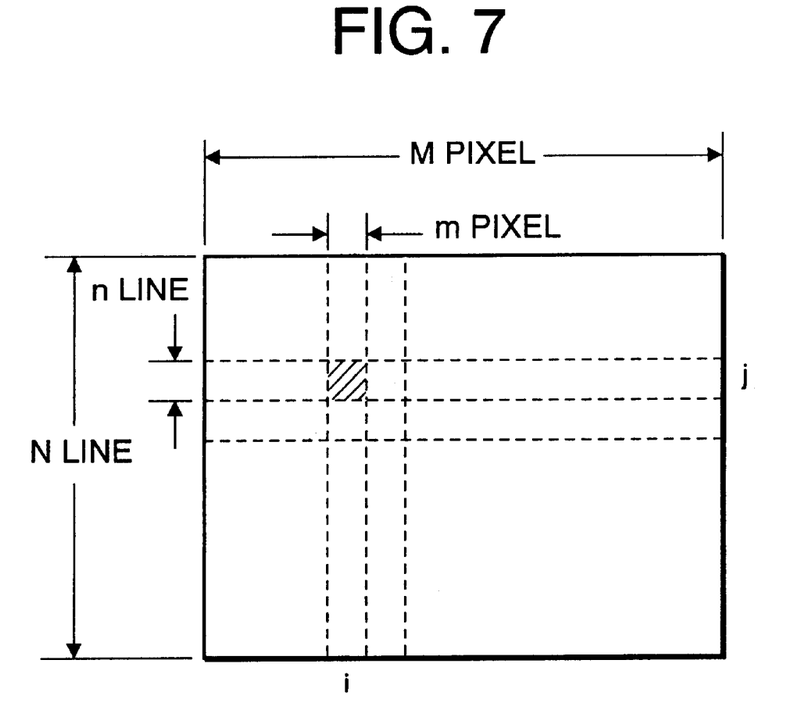
FIG. 7 is a diagram of divided blocks in digital picture.

In the picture coding apparatus in FIG. 1A, an input picture is transformed into digital signals in analog-digital transform circuit which is not shown and divided in blocks in m pixels in horizontal direction and n lines in vertical directions illustrated in FIG. 7. Each block of the input picture divided in block unit is provided into input terminal 1 as digital picture signals 101.

Next, DCT processing section 11 processes two-dimensional DCT to each block to output DCT coefficient 102. Quantizing section 12 receives DCT coefficient 102 and outputs quantized DCT coefficient 103. DCT coefficient coding section 13 receives DCT coefficient 103 and outputs code word 104 corresponding to the coefficient value.

Dequantizing section 23 receives DCT coefficient 103 and dequantization processes it to output DCT coefficient 108. Inverse two-dimensional DCT processing section 24 receives DCT coefficient 108 and inverse DCT processes it to obtain reproduced picture signal 109.

Filter selecting section 14 detects the noise generating in the reproduced picture by comparing input picture 101 and reproduced picture 109 and determines an appropriate filter to eliminate the noise.

Figure 2:
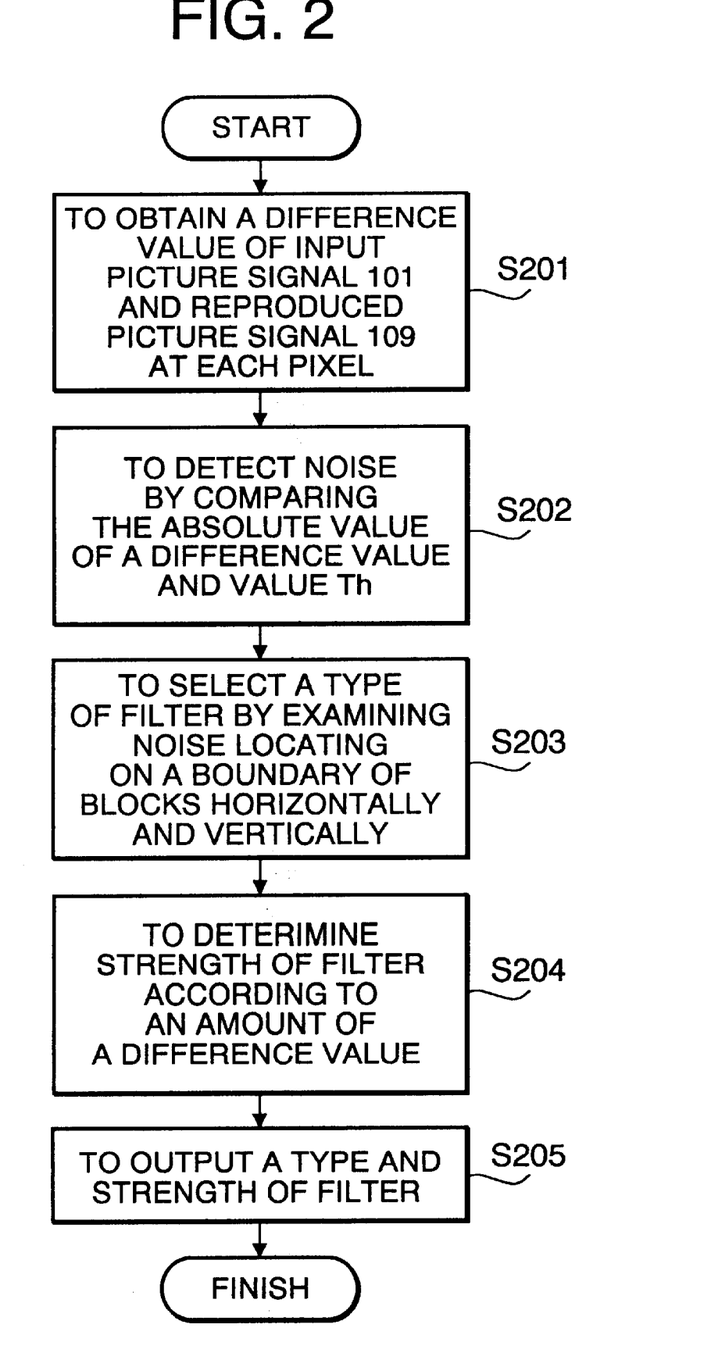
FIG. 2 is a flow chart showing contents of processing in a filter selecting section according to the embodiment of the present invention.

FIG. 2 is a flow chart for filter selecting section 14 to select an appropriate filter. The processing method in filter selecting section 14 is explained according to the flow chart.

First, the difference value between pixel values of input picture signal 101 and reproduced picture signals 109 on the same pixel in a block is calculated (Step 201). In the case where the absolute value of the difference value exceeds the value Th, it is judged that noise generations on the pixel(Step 202).

By measuring the difference value on the peripheral pixels of the pixel where the noise is generating, the noise distribution whether the generating noise is isolated or the noise generates in wide area including peripheries is measured.

Next, the characteristics of the appropriate correction filter for eliminating the noise generating in the reproduced picture is determined. In the case where noise generates on the pixel locating on the boundary between the block having horizontal position i, vertical position j [abbreviated as position (i,j) in the following] and the horizontally neighbor block having the position (i+1,j) as shown in FIG. 7, a correction filter having the appropriate configuration for correcting horizontally is selected. In the case where noise generates on the pixel locating on the boundary between the block having the position (i,J) and the block having the position (i,j+1), a correction filter having the appropriate configuration for correcting vertically is selected (Step 203).

Configurations of some correction filters are illustrated in FIG. 4. The correction filters illustrated in FIG. 4A to FIG. 4C have the configuration appropriate for correcting in horizontal direction. And the correction filters illustrated in FIG. 4D to FIG. 4F have the appropriate configuration for correcting in vertical direction. Furthermore the correction filters illustrated in FIG. 4G to FIG. 4I have the appropriate configuration for correcting in two-dimensional directions. In the processing of step 203, the filter configuration Is determined corresponding to the generating direction of noise.

Furthermore, the strength (coefficient) of correction filter is determined corresponding to an amount of a difference value between pixel values (Step 204). The filter strength is changed when a different coefficient is established even to the correction filters having the same configuration. The strength increases in order of A to C in the correction filters having the same configuration illustrated in FIG. 4A to FIG.4C. And the strength increases in order of D to F in the correction filters having the same configuration illustrated in FIG. 4D to FIG. 4F. Furthermore the strength increases in order of G to I in the correction filters having the same configuration illustrated in FIG. 4G to FIG. 4I.

Otherwise, the strength of correction filter can be determined from the average value of the difference value of pixels detected as noise on a block boundary (Step 204).

According to the operations described above, filter selecting section 14 determines the filter characteristics including filter correcting direction and strength and outputs information 105 concerning the correction filter (Step 205).

Filter information coding section 15 receives information 105 concerning the correction filter and provides code word 106 corresponding to information 105. Multiplexing section 16 receives code word 104 for DCT coefficient and coded signals 106 for filter information and outputs multiplexed code word 107.

Figure 6A:
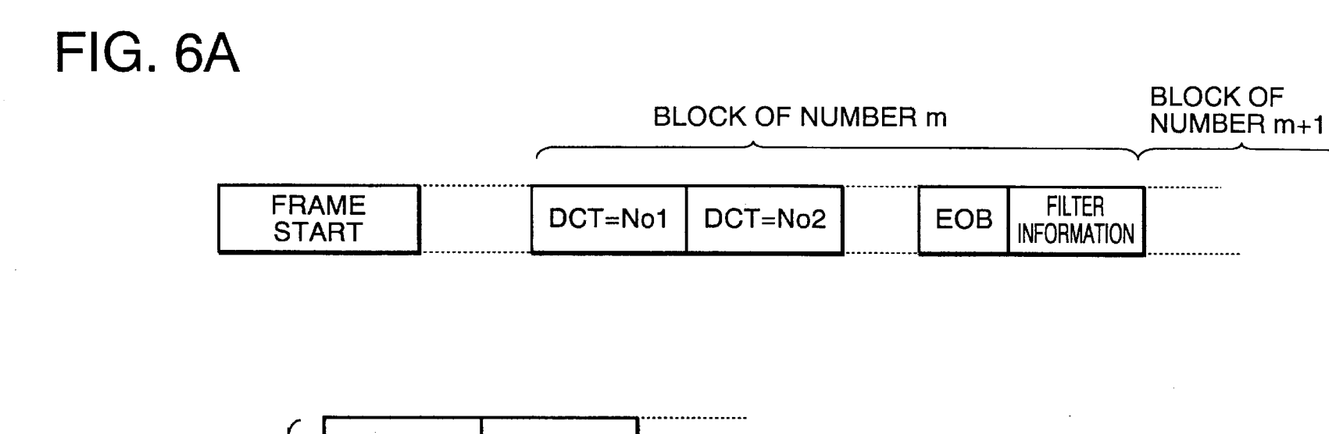
FIG. 6A is a diagram of frames for a multiplexed code word for picture and a code word for filter information.
Figure 6B:
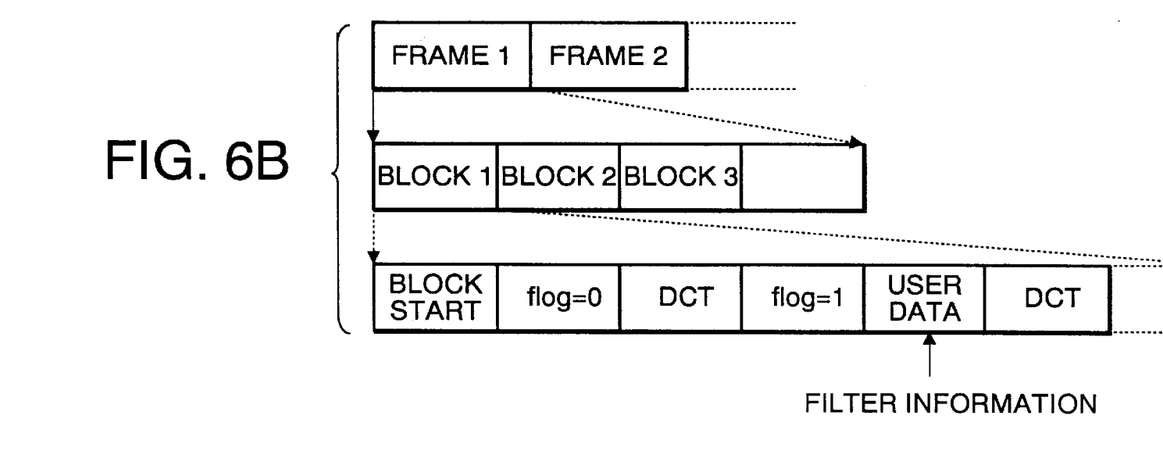
FIG. 6B is a diagram of frames for a multiplexed code word for picture and a code word for filter information by another method.

FIG. 6A and FIG. 6B. illustrate the multiplexed frame data received of code word 104 for the DCT coefficient and code word 106 for the filter information. In the example illustrated in FIG. 6A, code word 106 for the filter information is inserted after EOB locating in the end of the block. And in the example illustrated in FIG. 6B, the filter information is inserted in the region for user data in the block.

In the picture decoding apparatus illustrated in FIG. 1B, code word 107 input from input terminal 3 are divided into code word 104 for the DCT coefficient and code word 106 for the filter information by inverse multiplex section 21 and are output.

Next, code word 104 for DCT coefficient are input into DCT coefficient decoding section 22 then transformed to quantized DCT coefficient 103. Quantized DCT coefficient 103 is dequantization processed by dequantizing section 23 and output as DCT coefficient 108. Inverse two-dimensional DCT processing section 24 receives DCT coefficient 108 and inverse DCT processes it to obtain reproduced picture signals 109.

On the other hand, divided code word 106 for the filter information is input into filter information decoding section 25 to transform filter characteristics information 105 including the filter correcting direction and strength. This filter characteristics information 105 is provided to picture processing section 26.

In picture processing section 26, the correction filter having the configuration and the strength indicated in filter information 105 is selected from a plural of correction filters, image processing to eliminate noise by using the selected correction filter is carried out then corrected reproduced picture 110 is output.

Figure 3:
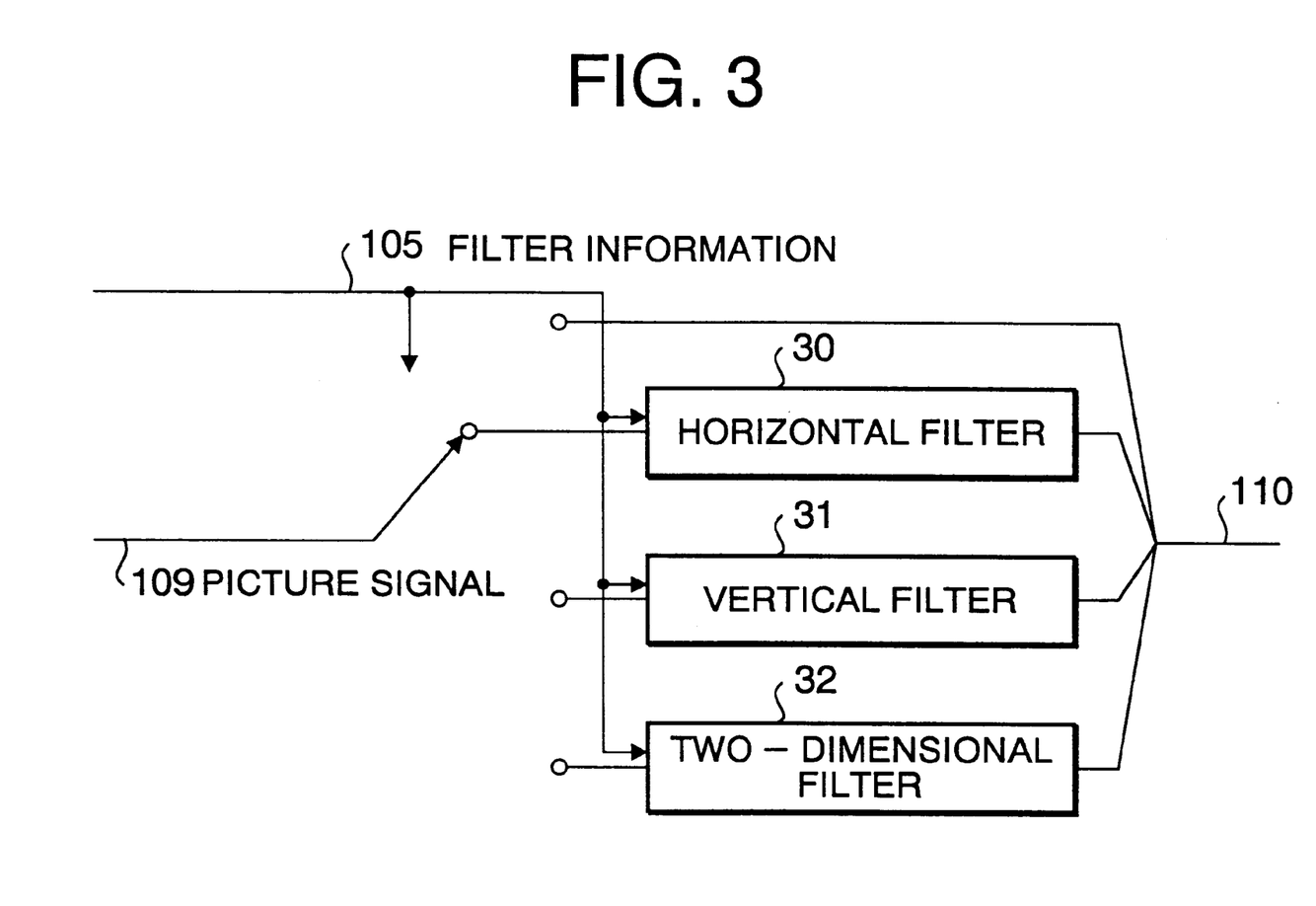
FIG. 3 is a block diagram of a picture processing section according to the embodiment of the present invention.

FIG. 3 illustrates the exemplary constitution of the filter section in image processing section 26. Three types of filter including horizontal filter 30, vertical filter 31 and two-dimensional filter 32 are prepared in image processing section 26. The filter coefficient of horizontal filter 30, vertical filter 31 and two-dimensional filter 32 can be varied.

Figure 4A:
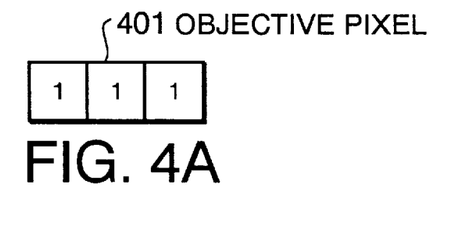
Figure 4B:
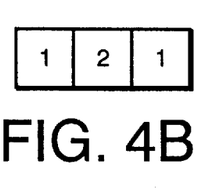
Figure 4C:
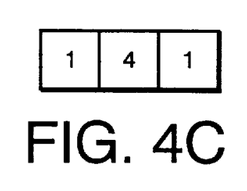
Figure 4D:
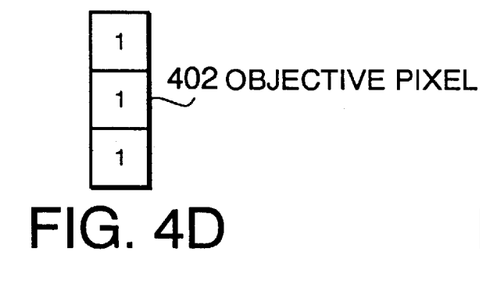
Figure 4E:
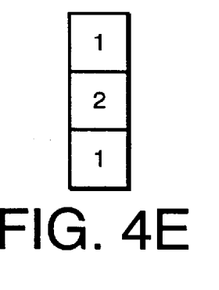
Figure 4F:
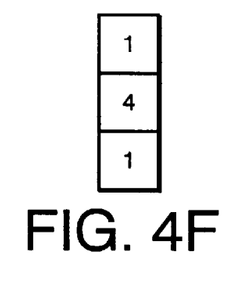
Figure 4G:
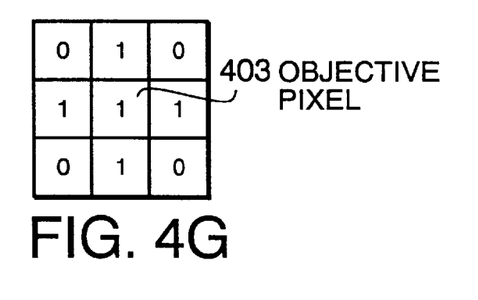
Figure 4H:
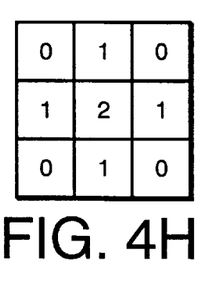
Figure 4I:
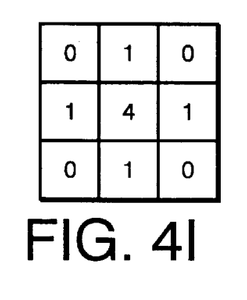
Figure 5:
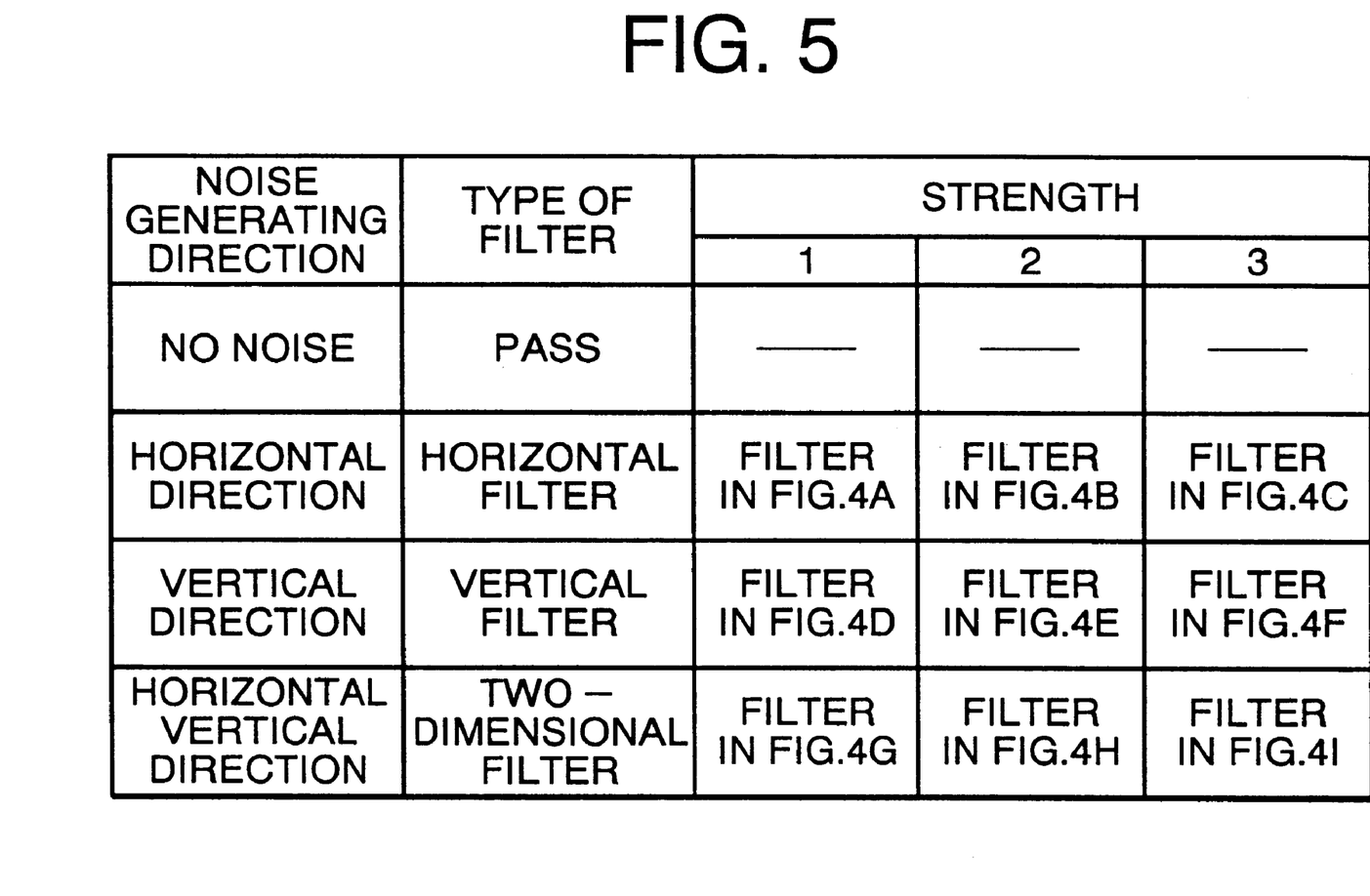
FIG. 5 is a diagram of filter selecting table according to the embodiment of the present invention.

In image processing section 26, after the filter configuration and strength contained in filter characteristics information 105 are input, the correction filter which is used for image processing on the pixel being current objective is determined according to the table illustrated in FIG. 5. For instance, in the picture coding apparatus illustrated in FIG. 1A, in the case where it is judged by filter selection section 14 that noise generates on the pixel at the position(i,j) and low-pass filtering in horizontal direction is necessary to correct it, the filter is changed to horizontal direction filter 30 according to filter characteristics information 105 then image processing is carried out. For instance, in the case where the correction filter in FIG. 4B is selected and the objected pixel is P(i,j), {P(i−1)*1+P(i,j)*2+P(i+1,j)*1}/3 is provided as an output. This is output as reproduced picture 110.

The picture coding apparatus and the picture decoding apparatus according to the embodiment described above are applied for image processing system in digital VTR, digital still camera and so on. In the image processing system, the code word in the picture coding apparatus according to the embodiment described above is stored along with filter information in a recording medium magnetically or optically such as DVD ,CD-ROM and so on. In the picture decoding apparatus according to the embodiment of described above, the signals reproduced from the recording medium are image processed by using an appropriate filter then decoded.

And the picture coding apparatus and the picture decoding apparatus according to the embodiment of as described above are available for image processing system in video telephone, digital conferencing system and so on coupled each other via transmission path of telephone wire, wire for exclusive use and etc. The picture coding apparatus and the picture decoding apparatus described above are mount in a terminal of video telephone and videoconferencing.

And the functions for the picture coding apparatus and the picture decoding apparatus explained above are implemented by executing its computer program recorded in a recording medium such as CD-ROM, FD(Floppy disk) and so on in computer.

Figure 8:
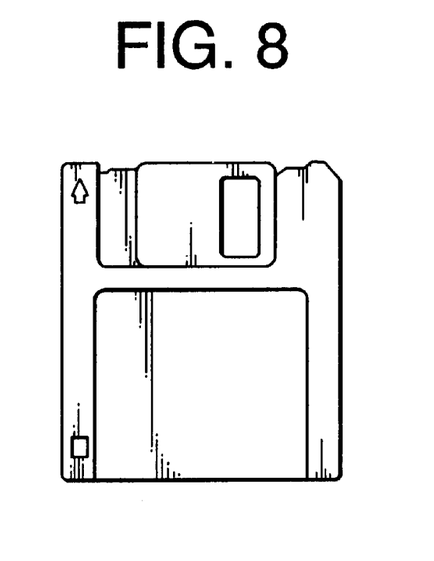
FIG. 8 is a plan view of a recording media to record the program according to the embodiment of the present invention.

The program for coding a picture can be implemented in any computer by using a medium, for instance 3.5 inch FD(Floppy disk) illustrated in FIG. 8, in which the program for coding an input picture by computer is recorded. The program comprises programs for coding an input picture for a current frame, reproducing the coded picture to obtain a partial reproduced picture, comparing the partial reproduced picture and the input picture to obtain a deteriorated part in a decoded picture, determining a filter to correct the deteriorated part in a decoded picture, coding the information concerning the selected filter and multiplexing code word for the filter information and code word for the coded picture.

In like manner, the program for decoding a picture can be implemented in any computer by using a medium, for instance 3.5 inch FD(Floppy disk) illustrated in FIG. 8, in which the program for decoding an decoded picture by computer is recorded. The program comprises programs for dividing the code word for the coded picture and the code word for the filter information from the code word coded by picture coding described above, determining the correction filter from the coded signals concerning the filter information along with reproducing a picture from the divided code word concerning the picture and correcting the reproduced picture by using the determined correction filter.

Industrial Applicability

As described above, the picture coding apparatus and the picture decoding apparatus in the present invention are available to select appropriate filter information to eliminate noise contained in a reproduced picture reproduced from a code picture by block dividing and applied for image processing system to reproduce a coded picture.

What is claimed is:

1. A picture coding apparatus comprising:
a picture coder that codes an input picture to obtain a coded input picture;
a picture reproducing unit that reproduces a picture from coefficients obtained from the coded input picture;
a noise detector that compares a partial area of the reproduced picture with a corresponding area of the input picture to detect a deteriorated part caused by the coding from the partial area of the reproduced picture; and
a filter information generator that generates filter information concerning filter characteristics which is appropriate for correcting the detected deteriorated part, wherein the coded input picture and the filter information are supplied to a decoding apparatus that decodes the coded input picture by using the filter information.

2. The picture coding apparatus according to claim 1, further comprising:
filter information coder that codes the filter information to produce a code word associated with the filter information; and
a multiplexer that multiplexes the code word associated with the filter information produced by the filter information coder and a code word associated with the coded input picture obtained by the picture coder.

3. The picture coding apparatus according to claim 1, wherein the noise detector determines that a noise is generated when a difference value between pixels of the input picture and the reproduced picture exceeds a threshold value.

4. The picture coding apparatus according to claim 1, wherein the filter information generator determines a direction of noise geneate on a boundary between adjacent partial areas and adds a filter configuration into the filter information, the filter configuration being determined based on the direction of noise.

5. The picture coding apparatus according to claim 1, wherein the filter information generator adds filter strength determined based on an amount of the difference value between pixels of the input picture and the reproduced picture into said filter information.

6. The picture coding apparatus according to claim 1, wherein the filter information generatr generates the filter information from a filter configuration determined in accordance with a direction of noises on a boundary between adjacent partial areas and filter strength determined in accordance with an amount of a difference value between pixels of the input picture and the reproduced picture.

7. The picture coding apparatus according to claim 1, wherein the picture coder has discrete cosine transforming unit that performs a discrete cosine transform of the input picture in a block unit to obtain a DCT coefficient, a quantizer that quantizes the DCT coefficient obtained by discrete cosine transforming the input picture and a code word generator that generates a code word associated with the quantized DCT coefficient;
and the picture reproducing unit has a dequantizer that dequantizer the quantized DCT coefficient to obtain a second DCT coefficient; and
an inverse discrete cosine transforming unit that performs an inverse discrete cosine transform of the second DCT coefficient to generate the reproduced picture.

8. A picture decoding apparatus comprising:
a dividing unit that extracts a code word associated with a picture and a code word associated with filter information from input signals, the filter information representative of filter characteristics appropriate to remove noise in a decoded image due to coding, the filter information being produced in a coding process performed at a coding apparatus;
a picture reproducing unit that reproduces the picture from the extracted code word associated with the picture;
a filter information reproducing unit that reproduces the filter information from the extracted code word associated with the filter information; and
an image processor that has a plurality of correction filters having different filter characteristics and that corrects the reproduced picture by using a selected one of the plurality of correction filters appropriate to the reproduced filter information.

9. The picture decoding apparatus of claim 8, wherein the image processor means has horizontal direction filters, vertical direction filters and two-dimensional low-pass filters as the plurality of filters.

10. A picture decoding apparatus according to claim 8, wherein the image processor has a filter selection table in which effective correction filters are associated with various noises based on filter configuration and filter strength, a selector that selects an appropriate correction filter from the filter selection table based on the filter configuration and the filter strength contained in the filter information and a filter switch that inputs the produced picture into a selected correction filter.

11. The picture decoding apparatus according to claim 8, wherein the filter information is determined, in a coding process, in accordance with a deteriorated part detected by comparing an original picture with a reproduced picture, which is obtained by coding the original picture and then decoding the coded original picture.

12. A picture coding method performed at a coding apparatus that supplies a coded picture to a decoding apparatus, the method comprising:
   coding an input picture to obtain a coded input picture;
   reproducing a picture from coefficients obtained from the coded input picture;
   comparing a partial area of the reproduced picture and a corresponding area of the input picture to detect a deteriorated part caused by coding from the partial area of the reproduced picture;
   generating filter information for filter characteristics which is appropriate for correcting the detected deteriorated part;
   coding the filter information; and
   multiplexing a code word associated with the coded filter information and a code word associated with the coded input picture for supplying the multiplexed code word associated with the multiplexed coded filter information and the code word associated with the coded input picture to the decoding apparatus.

13. A picture decoding method performed in a decoding apparatus, the method comprising:
   extracting a code word associated with a picture and a code word associated with filter information from input signals, the filter information representing filter characteristics appropriate to remove noise in a decoded image due to coding, the filter information being produced in a coding process performed at a coding apparatus;
   reproducing the picture from the extracted code word associated with the picture;
   reproducing filter information from the extracted code word associated with the filter information; and
   correcting the reproduced picture by using a correction filter suiting the reproduced filter information.

14. An image processing system comprising;
   a picture coding apparatus producing signals and including:
      a picture coder that codes an input picture to obtain a coded input picture;
      a picture reproducing unit that reproduces a picture from coefficients obtained from the coded input picture;
      a noise detector that detects a deteriorated part caused be the coding from a partial area of the reproduced picture, by comparing the partial area of the reproduced picture with a corresponding area of the input picture;
      a filter information generator that generates filter information concerning filter characteristics which is appropriate for correcting the detected deteriorated part;
      a filter information coder that codes the filter information to produce a code word associated with the filter information; and
      a multiplexer that multiplexes the code word associated with the filter information produced by the filter information coder and a code word associated with the coded input picture obtained by the picture coder to produce the signals;
   a recording medium to record the signals produced by the picture coding apparatus; and
   a picture decoding apparatus that reads the signals from the recording medium, the picture decoding apparatus including:
      a dividing unit that extracts a code word associated with a picture and a code word associated with filter information from the signals read from the recording medium, the filter information representative of filter characteristics appropriate to remove noise in a decoded image due to coding;
      a picture reproducing unit that reproduces the picture from the extracted code word associated with the picture;
      a filter information reproducing unit that reproduces the filter information from the extracted code word associated with the filter information; and
      an image processor that has a plurality of correction filters having different filter characteristics and that corrects the reproduced picture by using a selected one of the plurality of correction filters appropriate to the reproduced filter information.

15. The image processing system according to claim 14, wherein the signals produced by the picture coding apparatus are recorded on the recording medium by at least one of magnetic and optical recordings.

16. The image processing system of claim 14 applied for one of digital still camera, video CD system, DVD system and digital VTR.

17. An image processing system comprising:
   a picture coding apparatus producing signals and including:
      a picture coder that codes an input picture to obtain a coded input picture;
      a picture reproducing unfit that reproduces a picture from coefficients obtained from the coded input picture;
      a noise detector that detects a deteriorated part caused by the coding from a partial area of the reproduced picture, by comparing the partial area of the reproduced picture with a corresponding area of the input picture;
      a filter information generator that generates filter information concerning filter characteristic which is appropriate for correcting the detected deteriorated part;
      a filter information coder that codes the filter information to produce a code word associated with the filter information; and
      a multiplexer that multiplexes the code word associated with the filter information produced by the filter information coder and a code word associated with the coded input picture obtained by the picture coder to produce the signals;

a picture decoding apparatus receiving the signals and including:

a dividing unit that extracts a code word associated with a picture and a code word associated with filter information from the received signals, the filter information representative of filter characteristics appropriate to remove noise in a decoded image due to coding;

a picture reproducing unit that reproduces the picture from the extracted code word associated with the picture;

a filter information reproducing unit that reproduces the filter information from the extracted code word associated with the filter information; and an image processor that has a plurality of correction filters having different filter characteristics and that corrects the reproduced picture by using a selected one of the plurality of correction filters appropriate to the reproduced filter information; and transmission path connecting the picture coding apparatus and the picture decoding apparatus, the signals produced by the picture coding apparatus being transmitted to the picture decoding apparatus via the transmission path to be decoded by the picture decoding apparatus.

18. The image processing system claim 17 applied for a digital conferencing system.

19. A computer program product for operating a computer to encodes an input picture, the computer program product comprising:

a computer readable medium having computer program instruction codes embodied therein, the computer program product having:

a first computer program instruction code for instructing a computer processor to code the input picture to obtain a coded input picture, a second computer program instruction code for instructing a computer processor to reproduce a picture from coefficients obtained from the coded picture, a third computer program instruction code for instructing a computer processor to compare a partial area of the reproduced picture and a corresponding area of the input picture to detect a deteriorated part caused by coding in the reproduced picture; and a fourth computer program instruction code for instructing a computer processor to form filter information for filter characteristics which is appropriate for correcting the detected deteriorated part; and wherein the coded picture and the filter information are subjected to be supplied to a decoding process, in which the coded picture is decoded in accordance with the filter information, and wherein each of the computer program instruction codes is recorded on the computer readable medium in executable form and is loadable into a computer memory for executing by the computer processor.

20. A computer program product for operating a computer to decode input signals including a code word associated with a picture and a code word associated with filter information produced in a coding process, the computer program product comprising:

a computer readable medium having computer program instruction codes embodied therein, the computer program product having:

a first computer program instruction code for instructing a computer processor to extract the code word associated with the picture and the code word associated with filter information from the input signals, the filter information representing filter characteristics appropriate to remove noise in a decoded image due to coding;

a second computer program instruction code for instructing a computer processor to reproduce a picture from the extracted code word associated with the picture, a third computer program instruction code for instructing a computer processor to reproduce the filter information from the extracted code word associated with the filter information; and a fourth computer program instruction code for instructing a computer processor to switch correction filters according to the reproduced filter information, and wherein each of the program instruction codes is recorded on the computer readable medium in executable form and is loadable into a computer memory for executing by the computer processor.

* * * * *

UNITED STATES PATENT AND TRADEMARK OFFICE
CERTIFICATE OF CORRECTION

PATENT NO. : 6,249,610 B1
DATED : June 19, 2001
INVENTOR(S) : T. Matsumoto et al.

It is certified that error appears in the above-identified patent and that said Letters Patent is hereby corrected as shown below:

Column 8,
Line 6, before "filter" (first occurrence) insert -- a --.
Line 20, "geneate" should be -- generated --.
Line 30, "generatr" should be -- generator --.
Line 37, before "discrete" insert -- a --.
Line 45, "dequantizer" should be -- dequantizes --.

Column 9,
Line 4, after "processor" delete "means".
Line 14, "produced picture into a" should be -- reproduced picture into the --.

Column 10,
Line 50, "unfit" should be -- unit --.
Line 59, "characteristic" should be -- characteristics --.

Column 11,
Line 23, before "transmission" insert -- a --.

Signed and Sealed this

Eleventh Day of December, 2001

Attest:

NICHOLAS P. GODICI
Attesting Officer   Acting Director of the United States Patent and Trademark Office